United States Patent [19]

Hamashima

[11] Patent Number: 5,591,686
[45] Date of Patent: Jan. 7, 1997

[54] GOLDEN-COLORED SINTERED PRODUCT AND METHOD OF PREPARING THE SAME

[75] Inventor: Hiroshi Hamashima, Sendai, Japan

[73] Assignee: Kyocera Corporation, Kyoto, Japan

[21] Appl. No.: 516,014

[22] Filed: Aug. 16, 1995

Related U.S. Application Data

[63] Continuation of Ser. No. 191,939, Feb. 4, 1994, abandoned.

[30] Foreign Application Priority Data

Feb. 5, 1993 [JP] Japan .................................. 5-018656

[51] Int. Cl.$^6$ .................................................. C04B 35/58
[52] U.S. Cl. ................................................. 501/96
[58] Field of Search ............................... 501/96

[56] References Cited

U.S. PATENT DOCUMENTS 5,019,540  5/1991  Kuramoto et al. ........................ 501/96

Primary Examiner—Melissa Bonner
Attorney, Agent, or Firm—Loeb & Loeb LLP

[57] ABSTRACT

A golden-colored sintered product having a high hardness, strength, Young's modulus (rigidity) and excellent oxidation resistance and corrosion resistance and is useful as a sliding material, golden-colored ornamental material exhibiting beautiful color tone and as an abrasion-resistant material for such applications as a wall material, a timepiece material, brooches, necklaces, medals, buttons, fishing tools and the like, and to a method of preparing the same. The golden-colored sintered product has, as constituent elements, at least titanium, nitride and boron, and comprises 67 to 78% by weight of titanium, 6 to 15% by weight of nitrogen and 6.5 to 21.0% by weight of boron, wherein the carbon content is 3% by weight or smaller, titanium nitride and titanium boride are present as crystal phases in said sintered product, and crystal grains of said titanium nitride are linked to each other like chains.

4 Claims, 1 Drawing Sheet

40μm

GOLDEN-COLORED SINTERED PRODUCT AND METHOD OF PREPARING THE SAME

This is a continuation of application Ser. No. 08/191,939, filed on Feb. 4, 1994, now abandoned.

BACKGROUND OF THE INVENTION

1. Field of the Invention

The present invention relates to a golden-colored sintered product and a method of preparing the same. More specifically, the invention relates to a golden-colored sintered product having a high hardness, strength, Young's modulus (rigidity) and excellent oxidation resistance and corrosion resistance and is useful as a sliding material, golden-colored ornamental material exhibiting beautiful color tone and as an abrasion-resistant material for such applications as a wall material, a timepiece material, brooches, necklaces, medals, buttons, fishing tools and the like, and to a method of preparing the same.

2. Description of the Prior Art

As materials for ornamental purposes exhibiting gold color, there have heretofore been used a variety of metals such as pure gold, alloys thereof, brass and the like, as well as those metals of which the surfaces are plated with gold. However, these metals all have small hardnesses and get scratched on the surfaces or cracked when they come into contact with hard substances.

In order to solve such problems, there has so far been used the titanium nitride exhibiting high hardness, excellent oxidation resistance and beautiful gold color. To obtain the titanium nitride in the form of a sintered product, however, it must be sintered at a temperature which is as high as 2300° C. or more in compliance with a particular method. Besides, the obtained sintered product has a low flexural strength and is brittle.

In recent years, therefore, there have been used sintered alloys of gold color obtained by bonding the titanium nitride with metals of the iron group such as nickel and cobalt (see Japanese Patent Publication No. 58335/1990).

When a sintering aid composed of a metal of the iron group is added to the titanium nitride, however, discoloration takes place due to, for example, sea water or sweat as the corrosion proceeds in the metal phase in the sintered product, and the color of the ornamental material is impaired. Moreover, the sintering aid exhibits poor wetting property with respect to the titanium nitride, whereby many voids appear in the whole crystals and grain boundaries, and vivid mirror surface is not obtained despite the mirror-surface polishing is effected.

Moreover, the sintered alloys obtained by adding metals of the iron group or other corrosion-resistant aids to the titanium nitride followed by sintering all exhibit Vickers' hardness of smaller than 1500 $kg/mm^2$, which are not sufficient in terms of abrasion resistance and scratch resistance required for a variety of ceramic products and products having highly hard coatings which have been placed in the market in recent years.

With the sintered alloys using the above-mentioned metals of the iron group, furthermore, a sufficiently high Young's modulus is not obtained making the machining very difficult from the standpoint of, for example, obtaining a high dimensional precision required for the insertion products.

The present inventors have forwarded the study in order to solve the above-mentioned problems, and discovered the fact that a golden-colored sintered product having a sufficiently high strength, Young's modulus and excellent oxidation resistance and corrosion resistance is obtained when a titanium boride and a metal boron is added to the titanium nitride followed by sintering, without losing high hardness inherent in the titanium nitride.

SUMMARY OF THE INVENTION

It is therefore an object of the present invention to provide a golden-colored sintered product having a sufficiently high strength, Young's modulus (rigidity) and excellent oxidation resistance and corrosion resistance without losing high hardness inherent in the titanium nitride.

Another object of the present invention is to provide a sintered product having a sufficient hardness and strength for the ornamental uses and for the uses where abrasion resistance is required, and which can be used as a golden-colored slide material and a golden-colored ornamental material that can be machined maintaining good precision and exhibiting corrosion resistance.

A further object of the present invention is to provide a method of preparing the above-mentioned golden-colored sintered product.

According to the present invention, there is provided a golden-colored sintered product having, as constituent elements, at least titanium, nitride and boron, and comprising 67 to 78% by weight of titanium, 6 to 15% by weight of nitrogen and 6.5 to 21.0% by weight of boron, wherein the carbon content is 8% by weight or smaller, titanium nitride and titanium boride are present as crystal phases in said sintered product, and crystal grains of said titanium nitride are linked to each other like chains.

According to the present invention, furthermore, there is provided a golden-colored sintered product which further contains at least one of the metal elements of the Groups 4b, 5b and 6b of periodic table in an amount of 10% by weight or less.

The present invention further provides a method of preparing a golden-colored sintered product by sintering a molded product which comprises 20 to 60% by weight of titanium boride, 1 to 5% by weight of metal boron and the remainder of titanium nitride.

Moreover, the present invention provides a method of preparing a golden-colored sintered product by sintering a molded product which comprises 20 to 60% by weight of titanium boride, 1 to 5% by weight of a metal boron, 10% by weight or less of at least one of a carbide, a nitride and a carbonitride of a metal element of the Group 4a, 5a or 6a of periodic table, and the remainder of titanium nitride.

DETAILED DESCRIPTION OF THE PREFERRED EMBODIMENT

Figure 1:
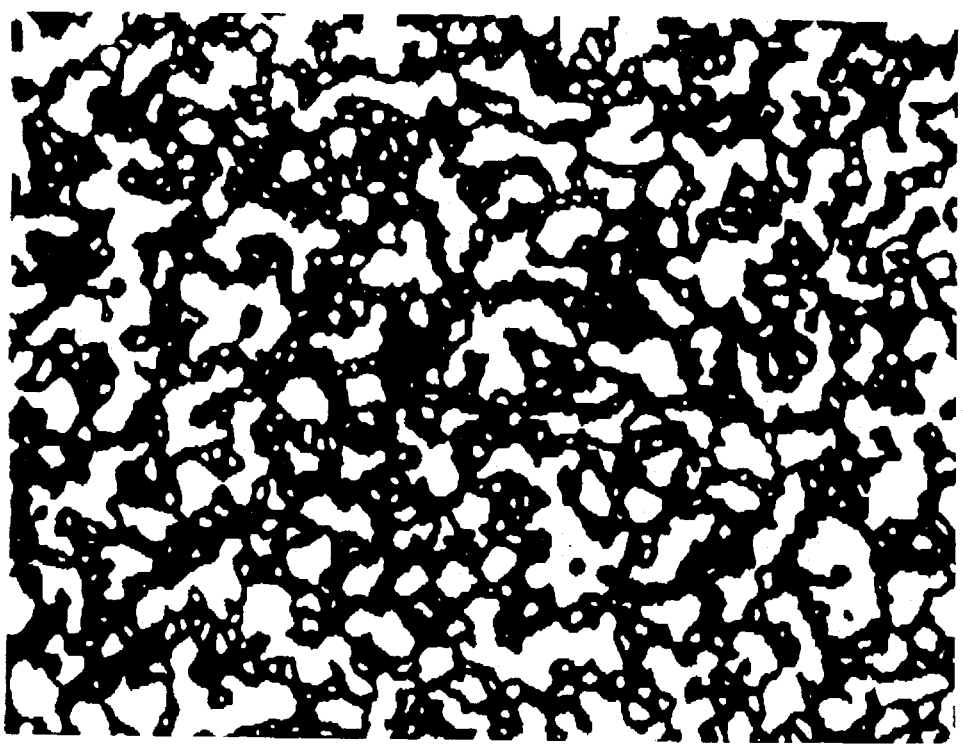
FIG. 1 is a diagram which schematically illustrates the structure of a sintered product of the present invention.

According to the present invention, a golden-colored sintered product is obtained by adding a metal boron to the titanium nitride, the metal boron uniformly wrapping the surfaces of the titanium nitride grains to form grains having a high hardness and exhibiting improved wetting property with respect to the titanium boride. Owing to these actions and properties, therefore, the golden-colored sintered product exhibits sufficiently high strength, Young's modulus (rigidity), excellent oxidation resistance, corrosion resistance and highly precise machinability without losing high hardness inherent in the titanium nitride.

According to the present invention, the entire composition of the sintered product comprises 67 to 78% by weight of titanium, 6 to 15% by weight of nitrogen, and 6.5 to 21.0% by weight of boron. When the amount of titanium is smaller than 67% by weight, the color tone tends to be faded and the corrosion resistance is deteriorated. When the amount of titanium is greater than 78% by weight, on the other hand, the hardness decreases.

When the amount of nitrogen is smaller than 6% by weight, the golden color tone becomes whitish and when its amount becomes greater than 15% by weight, the hardness and strength decrease.

When the amount of boron is smaller than 6.5% by weight, furthermore, the hardness decreases and when its amount becomes greater than 21.0% by weight, on the other hand, the color tone and the corrosion resistance are deteriorated.

The sintered product of the present invention may contain carbon as a component of a compound such as of an aid. In this case, the amount of carbon in the sintered product must be 8% by weight or smaller. This is because as the amount of carbon becomes greater than 8% by weight, the sintered product exhibits darkened color tone (reddish color) and loses corrosion resistance. In particular, the amount of carbon should desirably be 1.5% by weight or smaller.

Furthermore, the sintered product of the present invention should desirably contain at least one of the metal elements of the Groups 4b, 5b and 6b of periodic table in an amount of 10% by weight or smaller. This is because the addition of these elements in small amounts helps improve sintering properly. The amount of addition is limited to be 10% by weight or smaller for the reason that the sintering property is deteriorated when the amount of addition becomes greater than 10% by weight. It is desired that the amount of addition is from 0.5 to 9.5% by weight. Examples of the metal elements of the Groups 4b, 5b and 6b of periodic table to be added include Ti, W, Mo, Ta, Nb, V, Cr and Zr. The metal elements may be added in the form of a carbide, a nitride or a carbonitride thereof, or may be added by using milling bails containing such elements.

In the above-mentioned sintered product, it is particularly preferred to add Mo or Mo and Ta in combination, or Cr and W in combination.

The golden-colored sintered product of the present invention has a structure in which the metal boron or the metal boron and metal elements of the Groups 4b, 5b and 6b of periodic table exist in the form of solid solutions in the dispersion grain phase of the titanium nitride and the titanium boride. It is presumed that the metal boron and the metal elements of the Groups 4b, 5b and 6b of periodic table help improve wetting property of the titanium nitride and titanium boride. FIG. 1 illustrates the structure of this state as observed using a metal microscope at a magnification of 800 times, wherein, among the hard grains, the dispersion grains (black portions) of the titanium nitride are linked together in the form of chains, and the titanium boride grains of grain sizes of 1 μm or smaller exist around the linked grains though they are not recognizable at a magnification of 800 times.

The sintered product of a structure in which the crystalline titanium nitride grains are linked together like chains in the sintered product exhibits an increased Young's modulus (rigidity) and strength. The sintered product having the above-mentioned structure is obtained by firing a molded product which is obtained by adding 20 to 60% by weight of the titanium boride and 1 to 5% by weight of the metal boron to the titanium nitride at a suitable temperature. It is desired that the sintered product contains titanium in an amount of 68 to 77% by weight, nitrogen in an amount of 7 to 14% by weight and boron in an amount of 8 to 18% by weight. It is further desired that the crystalline titanium nitride grains have an average crystal gain size of 3 μm or smaller. Such an average crystal grain size is controlled by pulverizing the starting powder into sizes of 3 μm or smaller, adding 20 to 60% by weight of the titanium boride and 1 to 5% by weight of the metal boron to the titanium nitride, followed by firing at a suitable temperature.

The titanium nitride is fired by adding thereto the titanium boride in an amount of 20 to 60% by weight. This is because when the amount of the titanium boride is smaller than 20% by weight, the sintering property is not improved and when the amount of the titanium boride is larger than 60% by weight, titanium and boron decompose during the sintering, developing defects such as voids in the crystals resulting in a mirror surface of a sordid whitish color. Therefore, the sintered product is not utilizable as an ornamental material or as an abrasion-resistant material. It is desired that the titanium nitride is blended with the titanium boride at a ratio of, particularly, from 80 to 50% by weight. Further, the titanium nitride is fired by adding thereto the metal boron in an amount of 1 to 5% by weight. This is because when the amount of the metal boron is smaller than i% by weight, the strength decreases and the structure in which the grains are linked together like chains is less formed. When the amount of the metal boron is larger than 5% by weight, on the other hand, the corrosion resistance is deteriorated. It is therefore desired that the metal boron is blended in an amount of 2 to 4.5% by weight.

The golden-colored sintered product of the present invention is obtained by sintering a mixture powder of the titanium nitride, 20 to 60% by weight of the titanium boride and 1 to 5% by weight of the metal boron. Here, both the starting powder of the titanium nitride and the starting powder of the titanium boride should have an average grain size which is 4 μm or smaller and, particularly, 3 μm or smaller from the standpoint of activating the sintering property.

The metal boron may be either amorphous boron or crystalline boron. From the standpoint of sintering property and activating the reactivity, however, amorphous boron is particularly preferred.

The metal boron should have a particle size of 4 μm or smaller and, particularly, 2 μm or smaller from the standpoint of dispersion and activity.

Concretely described below is a method of preparing the golden-colored sintered product of the present invention. The starting powder of the titanium nitride is blended with the starting powder of the titanium boride, starting powder of the metal boron and, as required, other powders at the above-mentioned ratios. The mixture is then homogeneously mixed and the mixture powder is molded with the application of pressure by a conventional molding method such as the press-molding and is fired. The firing is carried out in a nonoxidizing atmosphere such as of nitrogen, argon or the like or in a vacuum atmosphere (vacuum degree of $10^{-2}$ to $10^{-5}$ torr) at a temperature over a range of from 1700° to 2000° C. for 0.5 to 3 hours. During the step of sintering, boron and nitrogen decompose and scatter in the form of gases. Here, the starting material composition and the firing time must be so controlled that the sintered product will have the aforementioned composition. This makes it possible to obtain a highly hard golden-colored sintered product having large strength and excellent oxidation resistance and corrosion resistance.

Embodiment

The present invention will now be described below.

A powder of the titanium nitride (TIN), a powder of the titanium boride (TiB$_2$), a powder of the amorphous metal boron metal (B) and other powders were blended at ratios shown in Table 1, and were mixed and pulverized for 68 hours.

After drying, paraffin was added thereto in an amount of 4% by weight, and the mixture was molded under the pressure of 1.5 tons/cm$^2$. After the binder was removed, the molded product was fired in vacuum of $10^{-3}$ torr at 1850° C. for one hour.

TABLE 1

| Sample No. | Starting material composition (% by weight) | | | | | |
|---|---|---|---|---|---|---|
| | TiN | TiB$_2$ | a-B | Others | | Total |
| *1 | 82.5 | 10.0 | 2.5 | TiC 2.5 | Mo$_2$C 2.5 | 5.0 |
| *2 | 79.0 | 19.8 | 0.5 | WC 0.7 | | 0.7 |
| 3 | 78.0 | 20.0 | 1.0 | TaN 0.5 | Mo$_2$C 0.5 | 1.0 |
| 4 | 68.0 | 29.7 | 1.8 | TaC 0.5 | | 0.5 |
| 5 | 63.0 | 28.0 | 5.0 | TiCN 1.0 | ZrN 3.0 | 4.0 |
| 6 | 50.5 | 37.0 | 3.0 | TiC 3.0 | NbC 6.5 | 9.5 |
| 7 | 50.5 | 46.0 | 3.5 | — | | — |
| *8 | 48.5 | 37.0 | 6.0 | VC 5.0 | Cr$_2$N 3.5 | 8.5 |
| 9 | 47.0 | 45.0 | 2.0 | Cr$_2$N 4.0 | WC 2.0 | 6.0 |
| 10 | 43.5 | 54.0 | 2.5 | — | | — |
| 11 | 43.4 | 45.0 | 3.6 | TiCN 4.0 | Mo$_2$C 4.0 | 8.0 |
| *12 | 40.6 | 48.5 | 5.5 | VC 3.0 | WC 2.4 | 5.4 |
| 13 | 37.2 | 60.0 | 1.8 | ZrCN 0.6 | NbC 0.4 | 1.0 |
| 14 | 31.5 | 58.0 | 4.3 | TiC 2.2 | Mo$_2$C 4.0 | 6.2 |
| *15 | 31.7 | 57.5 | 6.0 | VC 2.8 | TaC 2.0 | 4.8 |
| *16 | 26.5 | 65.0 | 4.1 | TiC 2.0 | TaN 2.4 | 4.4 |

Samples marked with * lie outside the scope of the invention.

After the surface of the sintered product was ground, the flexural strength and the Young's modulus (rigidity) were measured. After mirror surface-polished, furthermore, the color tone, Vickers' hardness and corrosion resistance of the mirror surface were measured. Moreover, the sintered product was pulverized to measure the composition of the sintered product. The flexural strength was measured in accordance with the three-point bending test stipulated under JIS R 1601, the Vickers' hardness was measured in accordance with the testing method of JIS Z 2244, and the Young's modulus was calculated by measuring the dynamic modulus of elasticity in compliance with the ultrasonic pulse method. Furthermore, the corrosion resistance was tested by using artificial sweat (pH 4.7) in compliance with the standards of the ISO (International Standardization Organization) as a corrosive solution and immersing the samples therein, and by spraying the salt water (4% by weight/vol) in an atomized form in compliance with the salt water spraying test (JIS Z 2371). As for the composition of the sintered product, titanium, boron, nitrogen and carbon were quantitatively analyzed relying upon the ICP emission spectroanalysis and by using a detector manufactured by LECO Co. for detecting the heat conductivities of carbon and a nitrogen gas. The results were as shown in Table 2.

TABLE 2

| Sample No. | Composition of sintered product (% by wt) | | | | | | | Young's modulus × 10$^4$ (kg/mm$^2$) | Flexural strength (kg/mm$^2$) | Vickers' hardness Hv (kg/mm$^2$) | Corrosion resistance ** | Color tone |
|---|---|---|---|---|---|---|---|---|---|---|---|---|
| | Ti | N | B | C | Others | | Total | | | | | |
| *1 | 75.8 | 15.5 | 4.7 | 2.3 | Mo 1.7 | | 1.7 | 4.30 | 64 | 1420 | O | yellowish gold color with poor luster |
| *2 | 78.5 | 15.0 | 6.0 | 0.2 | W 0.3 | | 0.3 | 4.21 | 60 | 1450 | O | yellowish color |
| 3 | 77.7 | 15.0 | 6.5 | 0.3 | Ta 0.3 | Mo 0.2 | 0.5 | 4.60 | 89 | 1640 | O | yellowish color |
| 4 | 76.0 | 13.8 | 9.8 | 0.2 | Ta 0.2 | | 0.2 | 4.75 | 105 | 1850 | O | yellowish color |
| 5 | 72.7 | 11.3 | 12.4 | 1.5 | Zr 2.1 | | 2.1 | 4.53 | 95 | 1770 | O | yellowish color |
| 6 | 68.8 | 9.6 | 12.8 | 3.0 | Nb 5.8 | | 5.8 | 4.69 | 102 | 1890 | O | orange yellowish color |
| 7 | 74.1 | 9.6 | 16.3 | — | — | | — | 4.59 | 86 | 1830 | O | yellowish color |
| *8 | 66.9 | 8.4 | 16.6 | 4.0 | V 2.1 | Cr 2.0 | 4.1 | 4.40 | 68 | 1690 | X | dark yellowish color |
| 9 | 70.0 | 8.9 | 15.3 | 1.8 | Cr 2.6 | W 1.4 | 4.0 | 4.83 | 105 | 2030 | O | pale yellowish color |
| 10 | 75.5 | 7.9 | 16.5 | 0.1 | — | | — | 4.67 | 92 | 1920 | O | yellowish color |
| 11 | 68.0 | 8.1 | 17.0 | 2.3 | Mo 4.6 | | 4.6 | 4.86 | 120 | 1980 | O | pale yellowish color |
| *12 | 66.2 | 8.4 | 20.2 | 3.6 | W 1.0 | V 0.6 | 1.6 | 4.38 | 88 | 1800 | X | gloomy yellowish color |
| 13 | 73.9 | 7.3 | 18.0 | 0.4 | Zr 0.2 | Nb 0.2 | 0.4 | 4.78 | 100 | 2150 | O | pale gold color |
| 14 | 67.0 | 6.0 | 21.0 | 2.7 | Mo 3.3 | | 3.3 | 4.59 | 93 | 2030 | O | pale orange gold color |
| *15 | 65.1 | 4.7 | 25.7 | 2.5 | V 1.4 | Ta 0.6 | 2.0 | 4.34 | 74 | 1870 | X | sordid whitish gold color |
| *16 | 70.0 | 5.5 | 21.7 | 1.2 | Ta 1.6 | | 1.6 | 4.40 | 68 | 2300 | X | sordid whitish gold color |

Samples marked with * lie outside the scope of the invention.
Corrosion resistance**:
O; represents good,
X; represents poor.

As for the results of corrosion resistance test of Table 2, the samples marked with O (good) were those which developed neither discoloration nor corrosion and did not lose color tone, either, even after the sweat resistance test and the salt water spraying test. On the contrary, the samples marked with X (poor) were those which developed discoloration or corrosion, lost color tone gradually, and were not suited for use as ornamental materials.

As will be obvious from Table 2, the golden-colored sintered products of samples 3, 4, 5, 6, 7, 9, 10, 11, 13 and 14 exhibited excellent corrosion resistance as well as excellent hardness and strength from the standpoint of ornamental use. Furthermore, the sintered products exhibited very high Young's moduli and could be machined maintaining good precision. Here, if the Young's moduli of other sintered products are mentioned for the purpose of comparison, SiC has 4.40, $Al_2O_3$ has 3.50, and TiN has 4.25 (unit in $10^4$ $kg/mm^2$).

Through the polishing, furthermore, the sintered products of the present invention exhibited smooth and vivid mirror surfaces of gold color, lending themselves well for use as ornamental materials having very excellent gold color and as abrasion-resistant materials.

On the other hand, the samples 1, 2, 8, 12, 15 and 16 that fell outside the composition range of the present invention all lacked strength. In particular, the samples 8, 12, 15 and 16 lacked corrosion resistance, exhibited gold color with poor luster or dark and sordid gold color, and could not be used as golden-colored ornamental materials. Moreover, the samples 1 and 2 failed to exhibit sufficiently high hardness.

I claim:

1. A golden-colored sintered product having, as constituent elements, at least titanium, nitride and boron, and comprising 67 to 78% by weight of titanium, 6 to 15% by weight of nitrogen and 6.5 to 21.0% by weight of boron, the sintered product having a carbon content not greater than 3% by weight, titanium nitride and titanium boride are present as crystal phases in the sintered product, and crystal grains of the titanium nitride are linked to give the appearance of a chain, further comprising at least one of the metal elements of the Groups 4b, 5b and 6b of the periodic table in an amount not greater than 10% by weight, wherein the metal elements comprise Ta and Mo, and the sum of Ta and Mo is between 0.5 and 9.5% by weight.

2. A golden-colored sintered product having, as constituent elements, at least titanium, nitride and boron, and comprising 67 to 78% by weight of titanium, 6 to 15% by weight of nitrogen and 6.5 to 21.0% by weight of boron, the sintered product having a carbon content not greater than 3% by weight, titanium nitride and titanium boride are present as crystal phases in the sintered product, and crystal grains of the titanium nitride are linked to give the appearance of a chain, and further comprising at least one of the metal elements of the Groups 4b, 5b and 6b of the periodic table in an amount not greater than 10% by weight, wherein the metal elements comprise Cr and W, and the sum of Cr and W is between 0.5 and 9.5% by weight.

3. A golden-colored sintered product having, as constituent elements, at least titanium, nitride and boron, and comprising 67 to 7.8% by weight of titanium, 6 to 15% by weight of nitrogen and 6.5 to 21.0% by weight of boron, the sintered product having a carbon content not greater than 3% by weight, titanium nitride and titanium boride are present as crystal phases in the sintered product, and crystal grains of the titanium nitride are linked to give the appearance of a chain, wherein a boron element exists in the form of solid solution in the crystal grain phase of the titanium nitride.

4. A golden-colored sintered product having, as constituent elements, at least titanium, nitride and boron, and comprising 67 to 78% by weight of titanium, 6 to 15% by weight of nitrogen and 6.5 to 21.0% by weight of boron, the sintered product having a carbon content not greater than 3% by weight, titanium nitride and titanium boride are present as crystal phases in the sintered product, and crystal grains of the titanium nitride are linked to give the appearance of a chain, further comprising at least one of the metal elements of the Groups 4b, 5b and 6b of the periodic table in an amount not greater than 10% by weight, wherein the metal elements comprise at least one element selected from Zr, V, Nb, Ta, Cr, Mo and W, wherein the metal elements comprise Ta and Mo, and the sum of Ta and Mo is between 0.5 and 9.5% by weight.

* * * * *